(12) United States Patent
Isley

(10) Patent No.: US 7,596,147 B2
(45) Date of Patent: Sep. 29, 2009

(54) APPARATUS AND METHOD FOR FRACTIONAL PROCESSING OF CELLS IN A COMMUNICATIONS SYSTEM

(75) Inventor: Kenneth Isley, Fogelsville, PA (US)

(73) Assignee: Agere Systems Inc., Allentown, PA (US)

( * ) Notice: Subject to any disclaimer, the term of this patent is extended or adjusted under 35 U.S.C. 154(b) by 455 days.

(21) Appl. No.: 11/476,279

(22) Filed: Jun. 28, 2006

(65) Prior Publication Data

US 2008/0002708 A1 Jan. 3, 2008

(51) Int. Cl.
 *H04L 12/54* (2006.01)
(52) U.S. Cl. .................. 370/429; 370/428; 370/418; 370/419; 370/395.1
(58) Field of Classification Search .................. None
See application file for complete search history.

(56) References Cited

U.S. PATENT DOCUMENTS

| | | | |
|---|---|---|---|
| 5,602,853 A | 2/1997 | Ben-Michael et al. | |
| 5,742,765 A | 4/1998 | Wong et al. | |
| 5,781,549 A | 7/1998 | Dai | |
| 5,802,287 A | 9/1998 | Rostoker et al. | |
| 5,809,024 A | 9/1998 | Ferguson et al. | |
| 5,845,153 A | 12/1998 | Sun et al. | |
| 5,991,295 A * | 11/1999 | Tout et al. ............. | 370/395.7 |
| 6,115,360 A | 9/2000 | Quay et al. | |
| 6,201,813 B1 | 3/2001 | Klausmeier et al. | |
| 6,205,151 B1 | 3/2001 | Quay et al. | |
| 6,262,995 B1 | 7/2001 | Kwak | |
| 6,430,187 B1 | 8/2002 | Park | |
| 6,483,854 B1 | 11/2002 | Klausmeier et al. | |
| 6,625,123 B1 | 9/2003 | Fukumoto et al. | |
| 6,711,167 B1 | 3/2004 | Ikeda et al. | |
| 6,804,243 B1 | 10/2004 | Humphrey et al. | |
| 2001/0019556 A1* | 9/2001 | Morzano ............. | 370/395 |
| 2001/0054135 A1* | 12/2001 | Matsuda ............. | 711/167 |
| 2002/0080821 A1 | 6/2002 | Hwang | |

(Continued)

FOREIGN PATENT DOCUMENTS

WO WO 2004049179 6/2004

(Continued)

OTHER PUBLICATIONS

Isley, K., "Apparatus And Method For Processing Cells In A Communications System," U.S. Appl. No. 11/095,769 (Mar. 31, 2005).

(Continued)

*Primary Examiner*—Jayanti K Patel
*Assistant Examiner*—Tito Pham
(74) *Attorney, Agent, or Firm*—Ryan, Mason & Lewis, LLP

(57) ABSTRACT

At least one cell in a communications system, from a network side, is caused to be stored into a cell buffer bulk memory. Responsive to detecting a predetermined fullness condition of a timeslot memory buffer, a predetermined number of bytes (corresponding to a fraction of the payload of the cell) are caused to be retrieved from the cell buffer bulk memory into the timeslot memory buffer. Responsive to a line-side data requirement, at least one of the predetermined number of bytes is caused to be retrieved from the timeslot memory buffer to a line side. By handling fractions of cells, the amount of dedicated high-speed memory required in prior-art techniques can be significantly reduced.

17 Claims, 13 Drawing Sheets

U.S. PATENT DOCUMENTS

2004/0085999 A1     5/2004    Burnett et al.
2007/0153796 A1*   7/2007    Kesavan et al. ............. 370/392
2007/0174529 A1*   7/2007    Rodriguez et al. .......... 710/240

OTHER PUBLICATIONS

Isley, K., "Apparatus And Method For Handling Lost Cells In A Communications System," U.S. Appl. No. 11/095,774 (Mar. 31, 2005).

McDysan, et al., "ATM Theory and Applications," Signature Edition, Section 13.2, (1999) (pp. 351-358).

Gast, M.S., "T1 A Survival Guide," Provisioning & Managing Leased-Line Circuits, pp. 1-43 (2001).

Handel et al., "ATM Networks; Concepts Protocols Applications," Third Edition, Sections 5.1.5 and 5.7 (1998)(pp. 51-55 and 93-107).

"Series I: Integrated Services Digital Network; Overall Network Aspects and Functions—Protocol Layer Requirements," B-ISDN ATM Adaptation Layer Specification: Type 1 AAL, ITU-T Telecommunication Standardization Sector of ITU, ITU-T Recommendation I.363.1 (Aug. 1996).

"Circuit Emulation Service Interoperability Specification Version 2.0," The ATM Forum Technical Committee (Jan. 1997).

* cited by examiner

FRACTIONAL ATM CELL METHOD

FRACTIONAL ATM CELL METHOD

FRACTIONAL ATM CELL METHOD

STEP 3: WHEN THE LINE SIDE REQUIRES DATA, RETRIEVE AN OCTET FROM THE TIMESLOT BUFFER MEMORY AND TRANSMIT IT TO THE LINE SIDE

CHECK THE DEPTH OF THE TIMESLOT BUFFER MEMORY, IF REQUIRED, EXECUTE STEP 2.

FRACTIONAL ATM CELL HANDLING PROCESS EXAMPLE

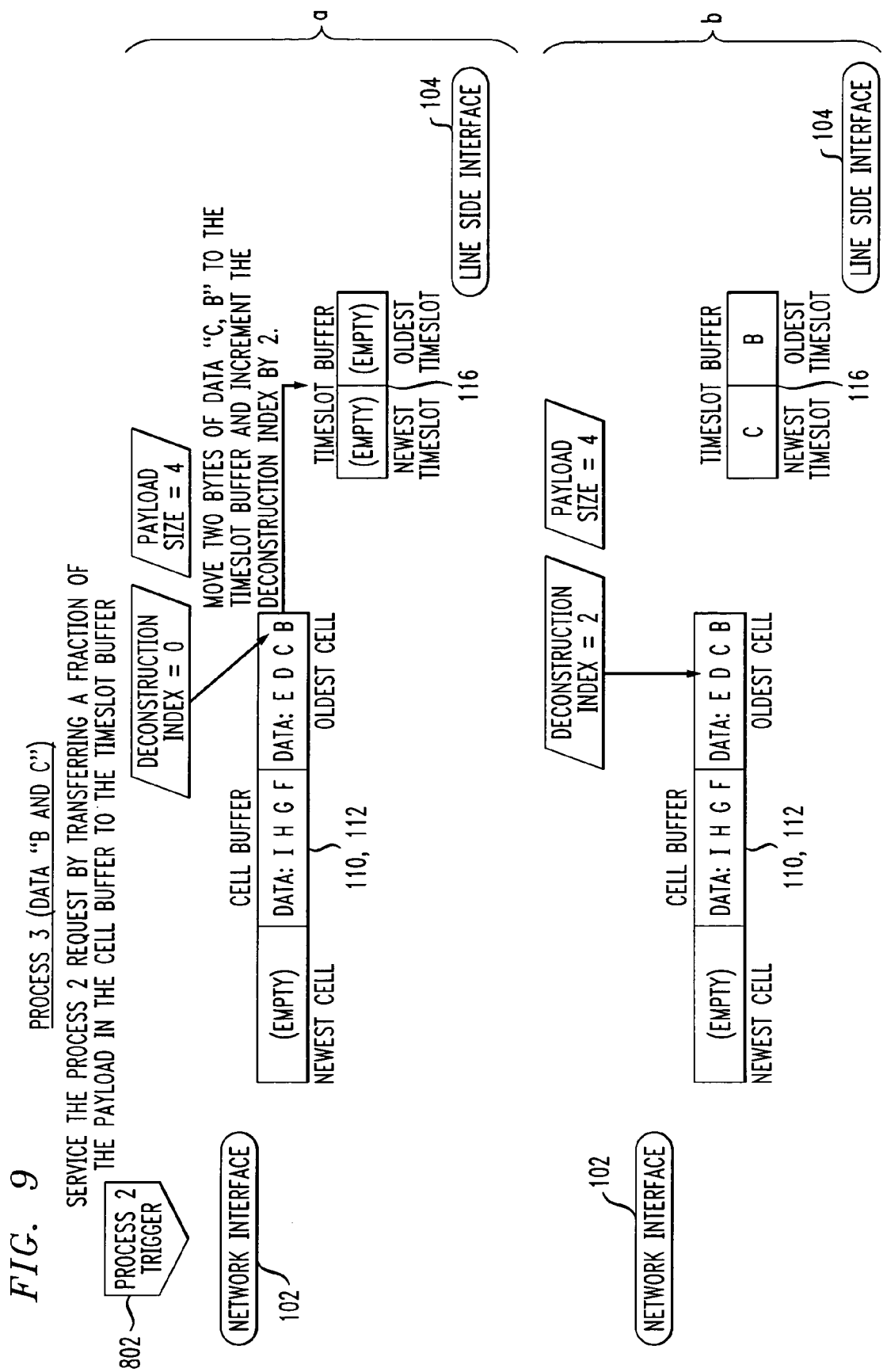

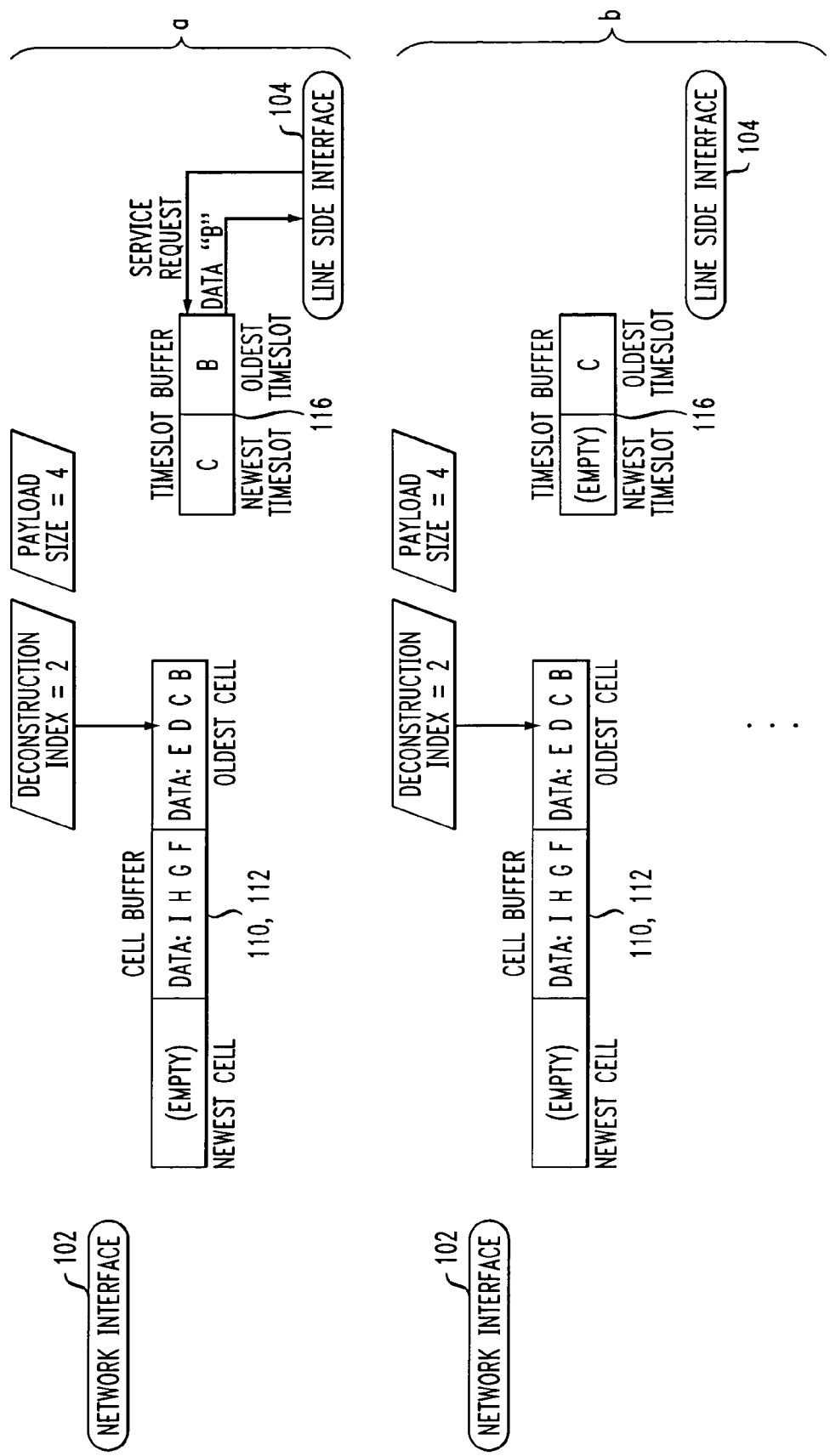

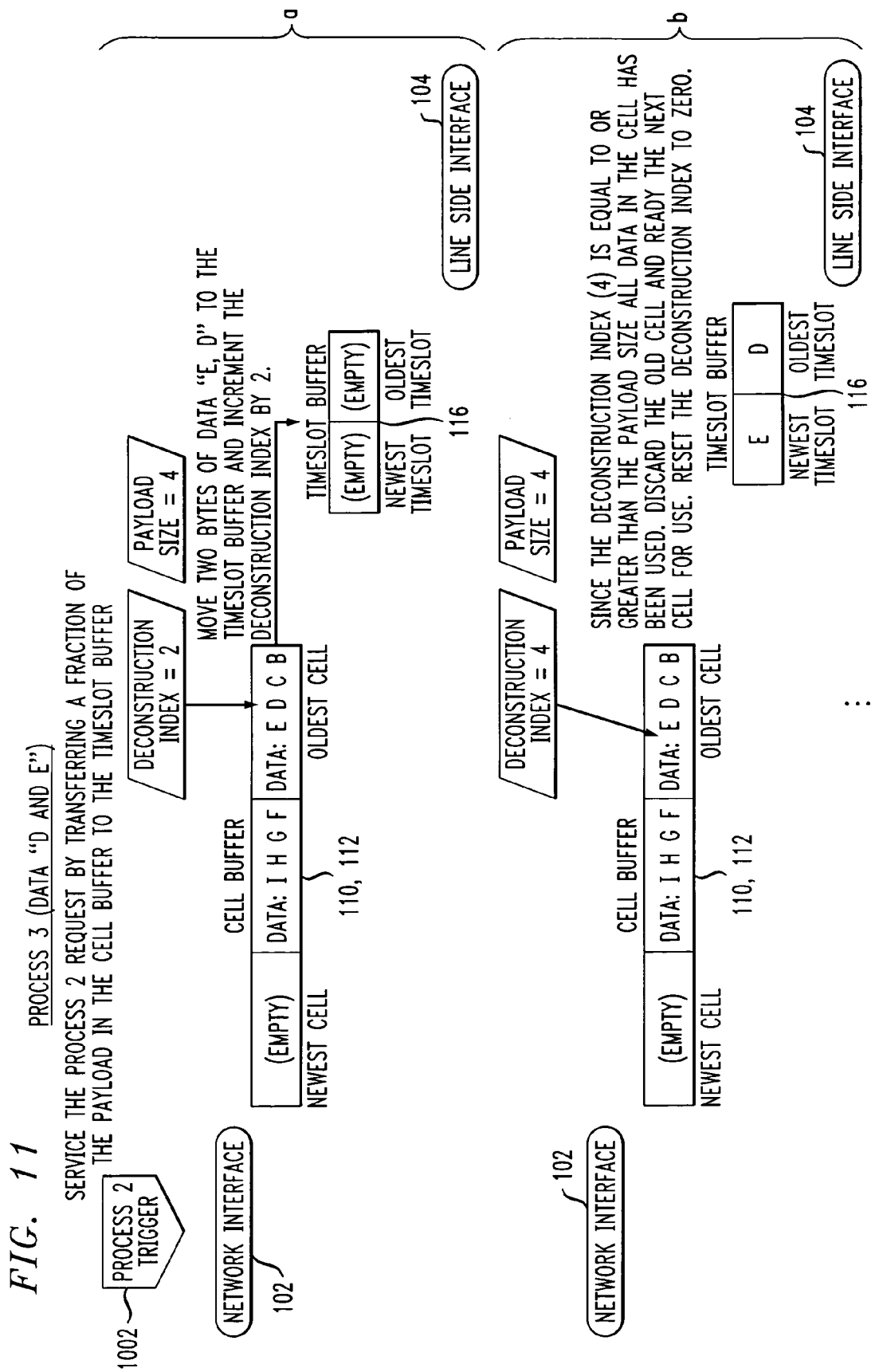

US 7,596,147 B2

APPARATUS AND METHOD FOR FRACTIONAL PROCESSING OF CELLS IN A COMMUNICATIONS SYSTEM

CROSS-REFERENCE TO RELATED APPLICATIONS

The present application is related to U.S. patent application Ser. No. 11/095,774 of Kenneth Isley, filed on Mar. 31, 2005, entitled "Apparatus and Method for Handling Lost Cells in a Communications System," and also to U.S. patent application Ser. No. 11/095,769 of Kenneth Isley, filed on Mar. 31, 2005, entitled "Apparatus and Method For Processing Cells in a Communications System." The disclosures of both such applications, which together with the present application are under a common obligation of assignment to Agere Systems Inc., are expressly incorporated herein by reference.

FIELD OF THE INVENTION

The present invention relates generally to communications systems, and more particularly relates to circuits and methods for segmenting and reassembling cells in a communications system.

BACKGROUND OF THE INVENTION

Asynchronous transfer mode adaptation layer 0 and 1 segmentation and reassembly (ATM AAL0/1 SAR) internetworking functions can require large amounts of high-speed memory for storage of timeslots and cells during the "timeslot to cell" and "cell to timeslot" conversions. For example, typical solutions may employ two buffers of 53 octets' worth of high-speed on-die memory per implemented virtual channel (VC). When implementing solutions for high channel counts, the amount of memory required for these buffers may represent a significant portion of the overall die space. This, in turn, increases the cost of ATM solutions.

One aspect of the invention disclosed in the '769 application provides a segmentation and re-assembly apparatus for interfacing with a cell delay variation buffer and a re-assembly memory buffer. Using two separate buffers allows the Cell Delay Variation (CDV) buffer to be implemented in a relatively less-expensive form of memory. In an illustrative embodiment, the apparatus can include a header and sequence number processing module that is configured to obtain a plurality of cells, and a cell delay variation buffer interface that is coupled to the header and sequence number processing module, and is configured to interface with the cell delay variation buffer. The illustrative embodiment can further include a re-assembly processing module that is coupled to the header and sequence number processing module, and a re-assembly memory buffer interface that is coupled to the re-assembly processing module and is configured to interface with the re-assembly memory buffer. The header and sequence number processing module can be configured to cause payloads from the cells to be stored in annotated form through the CDV buffer interface, and to cause a given one of the annotated payloads to be exacted through the interface. Payload information of the extracted annotated payload can then be passed to the re-assembly processing module. The re-assembly processing module can cause the payload information received from the header and sequence number processing module to be stored and retrieved through the re-assembly memory buffer interface.

Another aspect of the invention disclosed in the '769 application includes, in an exemplary method of processing cells in a communication system, the steps of obtaining a plurality of cells, causing payloads from the cells to be stored in annotated form in a CDV buffer, causing a given one of the annotated payloads to be extracted from the CDV buffer, causing payload information from the extracted annotated payload to be stored in a re-assembly memory buffer, and causing the payload information to be extracted from the re-assembly memory buffer.

Despite the fact that the invention disclosed in the '769 application represented a considerable advancement, still further improvements would be desirable.

SUMMARY OF THE INVENTION

By handling fractions of cells, the amount of dedicated high-speed memory required in prior-art techniques can be significantly reduced. An exemplary method of processing cells in a communications system, according to one aspect of the invention, includes a step of causing at least one of the cells, from a network side, to be stored into a cell buffer bulk memory. The cell has a payload with a number of data bytes. Further, responsive to detecting a predetermined fullness condition of a timeslot memory buffer, another method step includes causing a predetermined number of the bytes to be retrieved from the cell buffer bulk memory into the timeslot memory buffer. The predetermined number of bytes corresponds to a fraction of the payload of the cell. Further, responsive to a line-side data requirement, the method can include the step of causing at least one of the predetermined number of bytes to be retrieved from the timeslot memory buffer to a line side.

In another aspect, an exemplary embodiment of a circuit for processing cells in a communications system, between a network side and a line side, includes a cell processing module, a cell buffer bulk memory interface for interfacing with a cell buffer bulk memory, a timeslot processing module, and a timeslot memory buffer. The cell buffer bulk memory interface can be coupled to the cell processing module, as can the timeslot processing module. The timeslot memory buffer can be coupled to the timeslot processing module. The cell processing module can be configured to cause at least one of the cells, from the network side, to be stored into the cell buffer bulk memory. The cell can have a payload with a plurality of data bytes. The cell processing module can also be configured to cause a predetermined number of the bytes to be retrieved from the cell buffer bulk memory into the timeslot memory buffer, responsive to a predetermined fullness condition of the timeslot memory buffer. As discussed with regard to the exemplary method steps, the predetermined number of bytes corresponds to a fraction of the payload of the cell. The timeslot processing module can be configured to cause at least one of the predetermined number of bytes to be retrieved from the timeslot memory buffer to the line side, responsive to a line side data requirement.

A more complete understanding of the present invention, as well as further features and advantages of the present invention, will be obtained by reference to the following detailed description and drawings.

BRIEF DESCRIPTION OF THE DRAWINGS

FIG. 9 depicts certain exemplary details of process 3 in FIG. 6;

DETAILED DESCRIPTION

Figure 1:
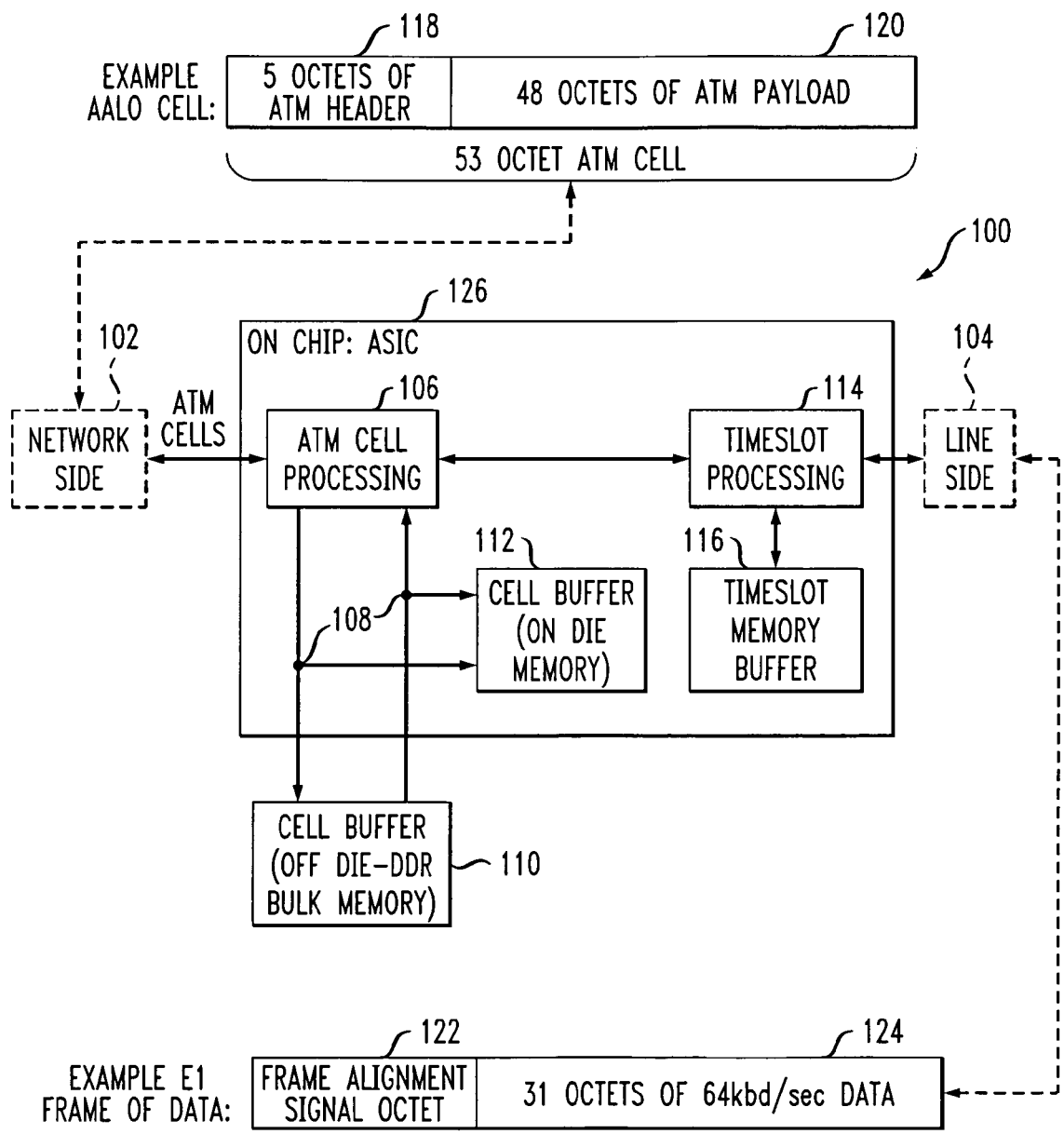
FIG. 1 shows a circuit for processing cells according to an exemplary embodiment of the invention, including certain exemplary details of the cells on the network side and data frames on the line side.

FIG. 1 shows a circuit 100 for processing cells in a communications system. The processing can be conducted between a network side 102 and a line side 104. The circuit can interface with a cell buffer bulk memory, for example, memory 110. As will be discussed below, other configurations of cell buffer bulk memory are possible. The circuit 100 can include a cell processing module 106. In the example shown in FIG. 1, the cell processing module is configured to process ATM cells. Further, a cell buffer bulk memory interface 108 can be included and can be coupled to the cell processing module 106. Additional details regarding interface 108 will be provided below.

A timeslot processing module 114 can be coupled to the cell processing module 106. A timeslot memory buffer 116 can be coupled to the timeslot processing module 114.

The network side 102 can be, e.g., a connectionless database-based network. For example, the network side data can include 53 octet ATM cells in a standard AAL0/1 format, having 5 octets (bytes) of ATM header 118 and 48 octets of ATM payload 120. The line side 104 can be, for example, a clocked telephone system or similar type of network with frames of data including frame alignment signal octets or bytes 122 and 31 octets or bytes of 64 kilobit per second data 124. For example, the line side data can include octets making up T1, E1, T3 circuits or other similar data streams. The example in FIG. 1 shows an E1 frame of data in accordance with specification ITU-T G.704.

One or more elements or components of the circuit 100 can be formed as part of an integrated circuit 126. In the example shown in FIG. 1, integrated circuit 126 includes the cell processing module 106, timeslot processing module 114, and timeslot memory buffer 116. The cell buffer bulk memory can be formed off-die, as shown at 110, or on-die, as shown at 112, or both off-die and on-die portions can be used. For the cell buffer formed on-die, as at 112, the interface 108 can simply correspond to conductive paths formed on the integrated circuit 126. For an off-die cell buffer bulk memory 110, the interface 108 can include an appropriate connector that is configured for off-die interconnection to the external cell buffer bulk memory 110. This is suggested by the circles shown at the end of leaders 108 in FIG. 1. It will be appreciated that when both an off-die cell buffer bulk memory 110 and on-die cell buffer bulk memory 112 are employed, cell processing module 106 can be configured for selective communication with both of the cell buffer bulk memories 110, 112. It will also be appreciated that providing a relatively small amount of on-die cell buffer memory 112, as well as the interface 108 to the external cell buffer 110, provides flexibility; where only modest amounts of memory are needed, the external cell buffer could be dispensed with, but where larger amounts are needed, a separate external cell buffer can be readily employed.

Figure 2:
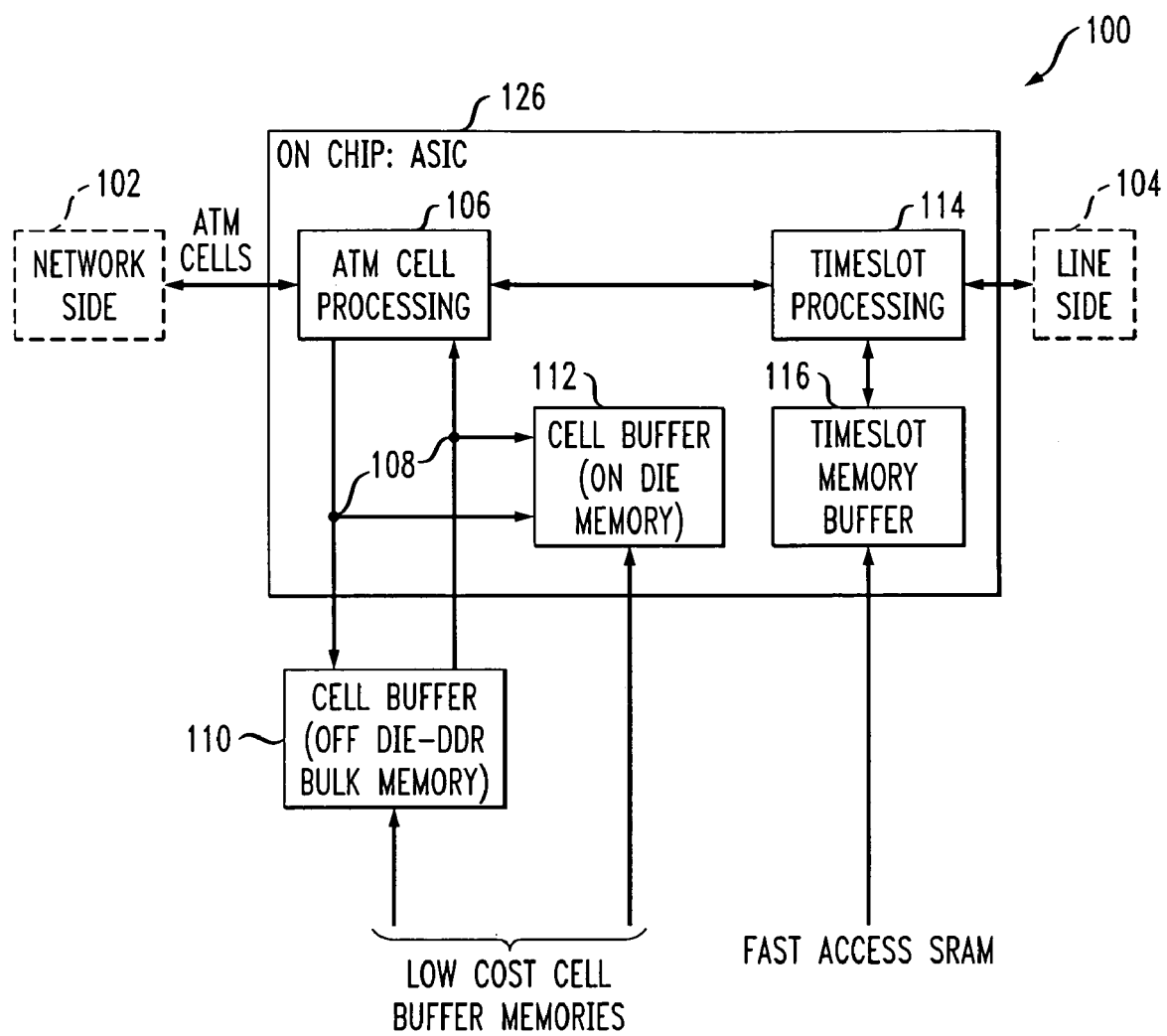
FIG. 2 shows the circuit of FIG. 1, with certain helpful details regarding memory buffers.

FIG. 2 is similar to FIG. 1, but shows certain details regarding memories 110, 112, 116. Note that elements of FIG. 2 similar to those in FIG. 1 have received the same reference character and are not discussed again. It is generally desirable to implement large memories in relatively low-cost technologies such as double data rate synchronous dynamic random access memory (DDR SDRAM). Thus, cell buffer bulk memories 110, 112 can be preferably implemented in relatively low-cost technologies such as the aforementioned DDR SDRAM. In such case, the relatively expensive fast access static random access memory (SRAM) employed for timeslot memory buffer 116 can be reduced or minimized. This can be done if a fragment of the overall ATM cell payload is retrieved from the slower, low-cost buffer memories 110, 112 and transferred into the fast access SRAM of timeslot memory buffer 116, where it is readily available to the interface with the line side 104. Employing low-cost memories for buffers 110, 112 may increase access times for read and/or write operations, may require burst-type operation of the memories, and may require memories that are wider than 8 bits. The buffers 110, 112, 116 can be configured to operate in a first-in first-out (FIFO) fashion. The inventive concept of employing the low-cost memory for buffers 110, 112 is believed to afford the potential for substantial cost savings. It will be appreciated that in one or more embodiments, the low-cost cell buffer memories can be used to store data for the adaptation between AAL0/1 ATM Cell formats and the Line Side T1/E1 circuit-based connections.

Figure 3:
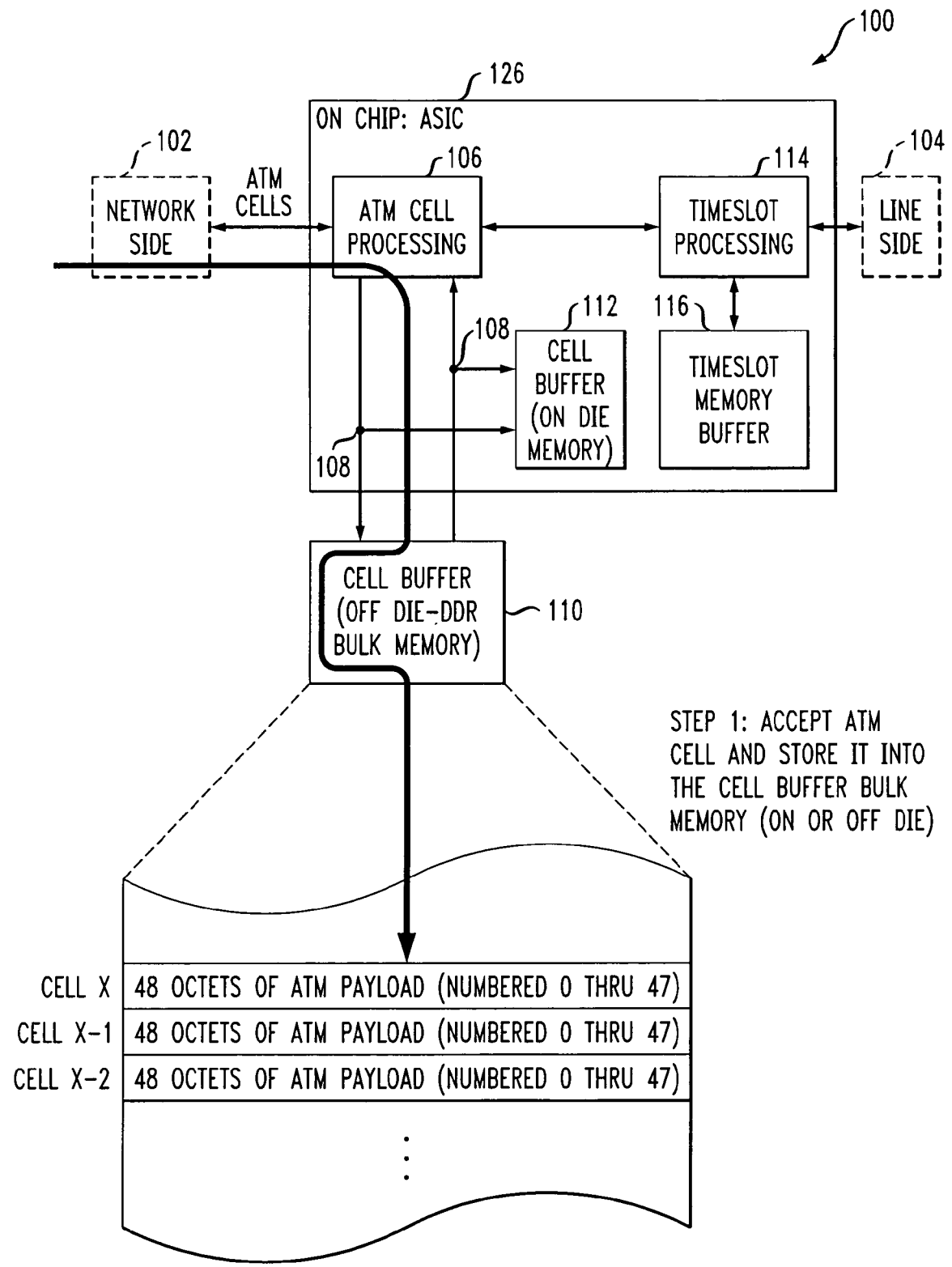
FIG. 3 shows the circuit of FIG. 1 employed to perform an exemplary method step.

It will be appreciated that the circuit 100 described herein is one of a number of possible apparatus that can be configured to practice method steps to be described herein. Certain exemplary method steps will now be described with particular reference to the circuit 100. Additional discussion of exemplary method steps will be provided below. FIG. 3 shows the circuit 100 previously described. As shown in FIG. 3, an ATM cell can be accepted and can be stored in the cell buffer bulk memory, either on-die 112 or off-die 110. Storage in the off-die memory 110 is depicted in the example of FIG. 3. Three cells are shown stored in the bulk memory 110, cell X, cell X-1, and cell X-2, each having a payload with 48 bytes (octets) numbered 0-47. Thus, the cell processing module 106 can be configured to cause one or more cells from network side 102, having as payloads a number of data bytes or octets, to be stored in cell buffer bulk memory 110 and/or 112.

Figure 4:
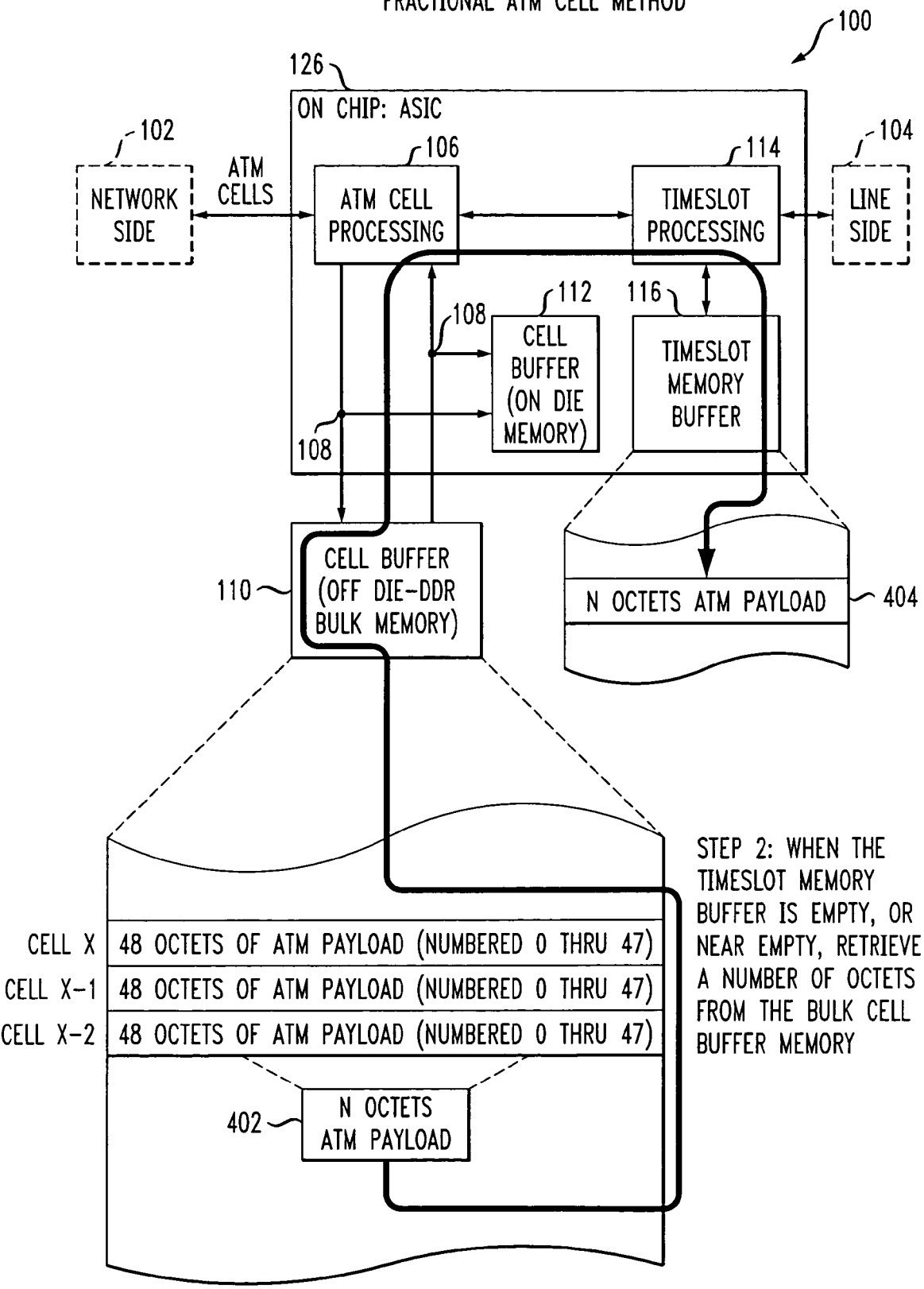
FIG. 4 shows the circuit of FIG. 1 employed to perform another exemplary method step.

FIG. 4 shows the circuit 100 with reference to another method step. Specifically, when the timeslot memory buffer 116 is empty, or almost empty, a number of bytes (octets) can be retrieved from the cell buffer bulk memory 110 and/or 112. Thus, it will be appreciated that the cell processing module 106 can be configured to cause a predetermined number of bytes to be retrieved from the cell buffer bulk memory 110 and/or 112 into the timeslot buffer memory 116. This retrieval can be responsive to a predetermined fullness condition (e.g., depth) for the timeslot memory buffer 116, for example, the aforementioned condition of being empty or almost empty. The predetermined number of bytes, or octets, can be designated as N and is a fraction of the payload of one of the cells in buffer 110. The retrieval of the N bytes or octets is shown at locations 402, 404 in FIG. 4. It will be appreciated that timeslot processing module 114 can be configured to cause the depth of the timeslot memory buffer 116 to be checked.

The number of bytes, N, to be retrieved from the cell buffer bulk memory into the timeslot memory buffer can be determined based on a number of factors, including virtual channel characteristics, memory width, memory latency, memory speed, processor speed, and/or processor latency.

FIG. 5 again shows the circuit 100 with respect to yet another exemplary method step. Specifically, when the line side 104 requires data, a byte or octet of data can be retrieved from the timeslot memory buffer 116 and transmitted to the line side 104. Furthermore, the depth of the timeslot memory buffer 116 can be checked, and if needed, a number of octets can be retrieved from the cell buffer bulk memory, as previously discussed with regard to FIG. 4. Thus, the timeslot processing module 114 can be configured to cause at least one of the predetermined number of bytes that were fetched as shown in FIG. 4 to be retrieved from the timeslot memory buffer 116 to the line side 104, in response to the line-side data requirement. In the example shown in FIG. 4, a single octet or byte of data is retrieved from the timeslot memory buffer 116 when required by line side 104.

Figure 5:
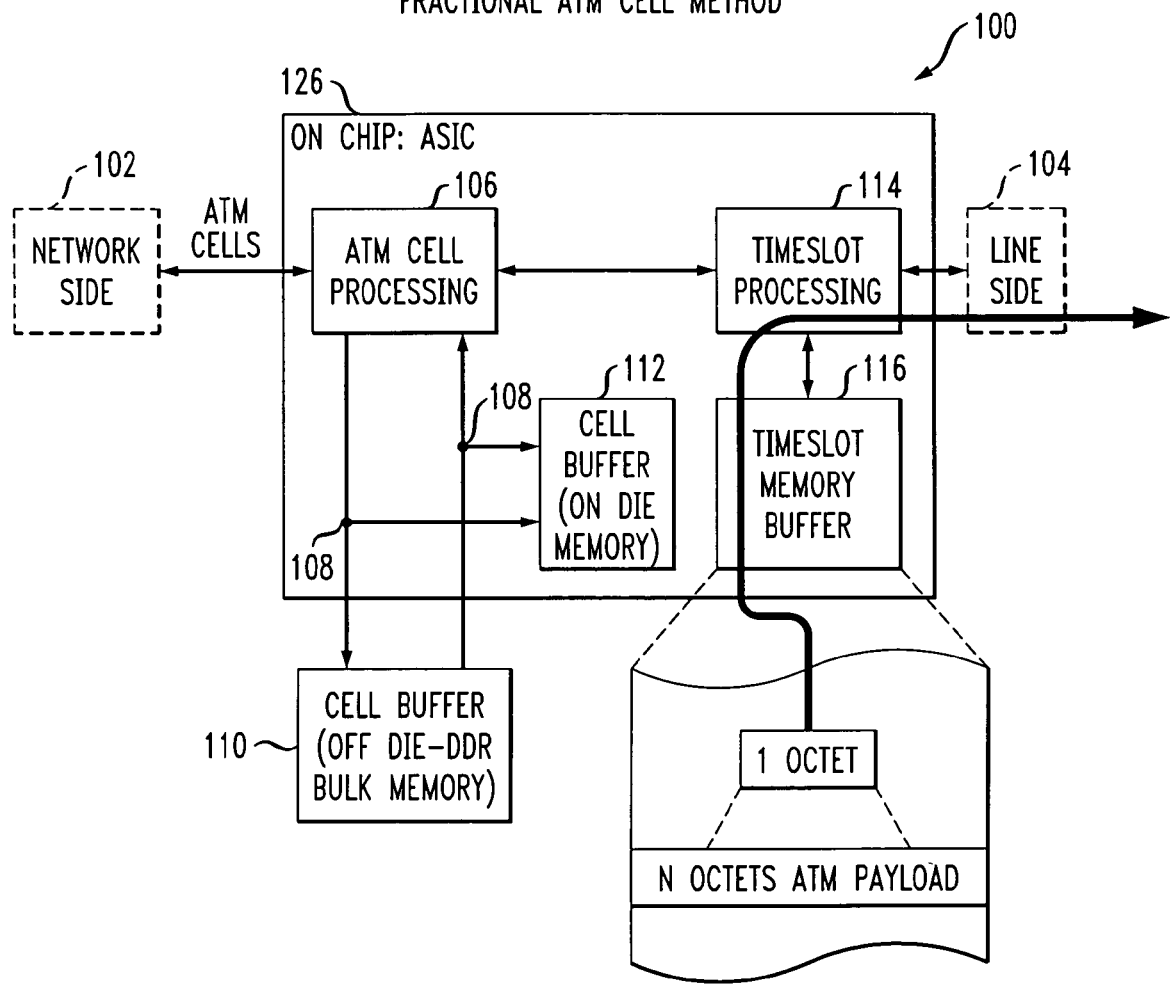
FIG. 5 shows the circuit of FIG. 1 employed to perform yet another exemplary method step.

Certain steps, designated as steps 1, 2 and 3 have been discussed with regard to FIGS. 3-5. It will be appreciated that these can be performed in any convenient order. Further, it will be appreciated that in one aspect, circuit 100 can be envisioned as a timeslot memory buffer 116 and a (single) processor coupled to the timeslot memory buffer and configured to interface with the cell buffer bulk memory 110 and/or 112. The processor could be configured to perform, e.g., the functions of elements 106, 108, 114, e.g., to cause a payload of a network side cell to be stored into the cell buffer bulk memory, and to cause a fraction of the payload of the cell to be retrieved from the cell buffer bulk memory into the timeslot memory buffer (responsive to a predetermined fullness condition of the timeslot memory buffer), for subsequent data retrieval from the timeslot memory buffer to the line side in response to a line-side data requirement.

Figure 6:
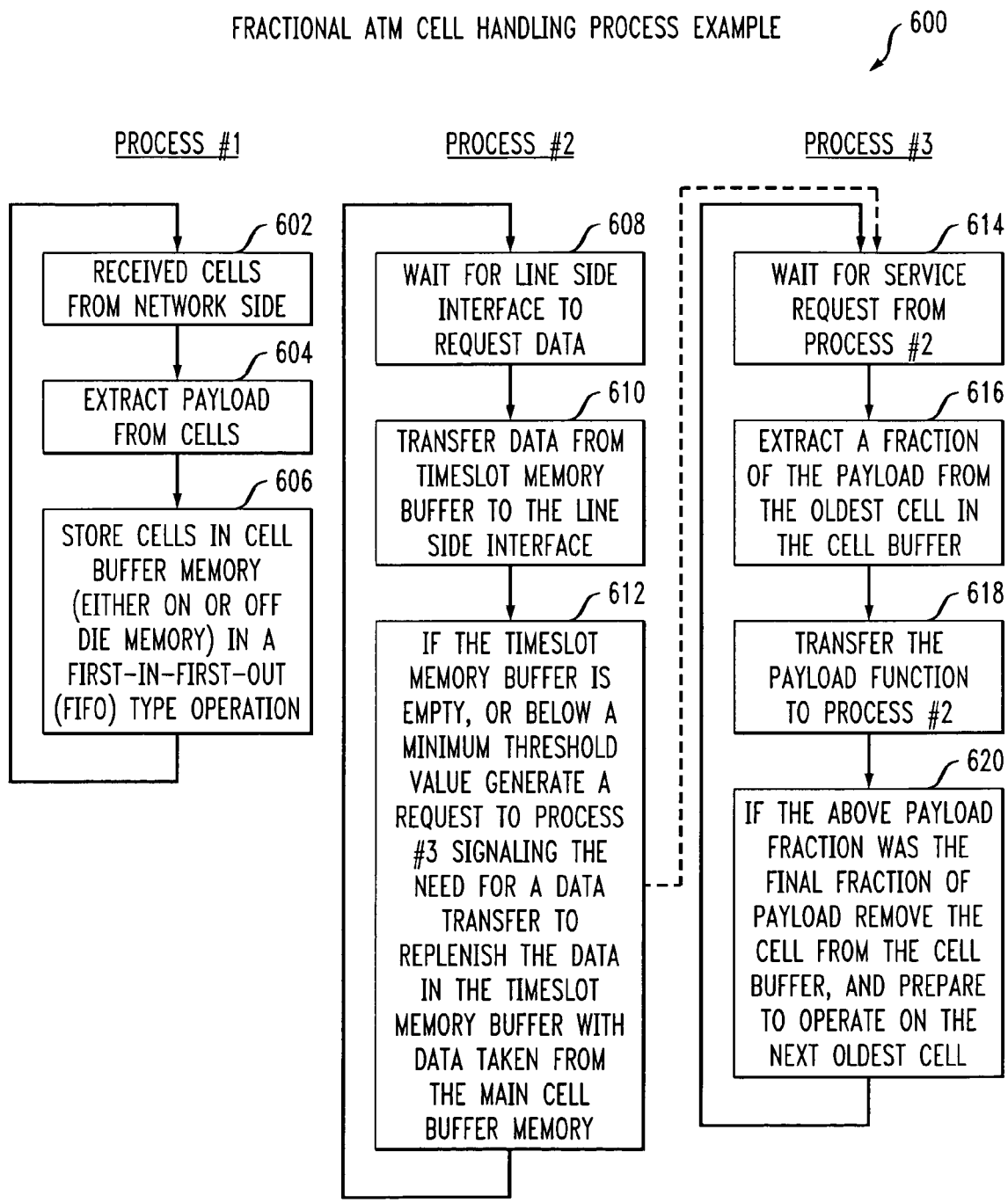
FIG. 6 is a flow chart showing an exemplary implementation of a method according to one aspect of the invention.

FIG. 6 depicts a flowchart 600 of exemplary method steps in a method of processing cells in a communications system, according to an aspect of the invention. The method can include the step of causing at least one of the cells, from a network side, to be stored into a cell buffer bulk memory. The cell can have a payload with a plurality of data bytes. One possible manner of carrying out this step is to receive cells from a network side, as shown at block 602, extract the payload from the cells as shown at block 604, and then store the cells in a cell buffer memory, either on-die or off-die, in a first-in-first-out (FIFO) type operation, as at block 606. In the exemplary method shown in FIG. 6, the aforementioned steps 602-606 are performed as part of a first process.

Another method step can include causing a predetermined number of the bytes to be retrieved from the cell buffer bulk memory into the timeslot memory buffer. The predetermined number of bytes can correspond to a fraction of the payload of the cell. The causing of the retrieval of the bytes from the cell buffer bulk memory can be responsive to detecting a predetermined fullness condition of the timeslot memory buffer. One possible manner of conducting the step just described is by carrying out steps 614-620, shown with respect to process number 3 of FIG. 6. These steps will be described in detail below, after description of steps corresponding to process 2, for greater clarity.

A further step in the exemplary method can include causing at least one of the predetermined number of bytes to be retrieved from the timeslot memory buffer to the line side. This retrieval can be in response to a line side data requirement. This step of causing the bytes to be retrieved from the timeslot memory buffer to the line side can be carried out, for example, by process number 2 shown in FIG. 6. In particular, at block 608, the process waits for the line side interface to request data. At block 610, responsive to a request, data is transferred from the timeslot memory buffer to the line side interface. Then, at block 612, if the timeslot memory buffer satisfies a predetermined fullness condition, for example, being empty or below a minimum threshold, a request can be generated to process number 3 signaling the need for a data transfer to replenish the data in the timeslot memory buffer with data taken from the cell buffer memory. This is shown at block 612 of process number 2. The service request to process number 3 is indicated by the dotted line.

As shown in process number 3, at block 614, the process waits for a service request from process number 2. At block 616, a fraction of the payload from the oldest cell in the cell buffer is extracted. At block 618, this payload fraction is transferred to process number 2. At block 620, if the payload fraction was the final fraction of payload for that cell, that cell is removed from the cell buffer, and preparation is made to operate on the next oldest cell. It will be appreciated that each process in FIG. 6 loops continuously, as indicated by the return arrows.

The timeslot memory buffer, cell buffer bulk memory, and other elements discussed with regard to the exemplary method of FIG. 6 can be similar to those described above with regard to FIGS. 1-5. Process one can be carried out for a plurality of cells from the network side, such that a plurality of the cells are stored in the cell buffer bulk memory. As discussed above with respect to FIGS. 1-5, the predetermined fullness condition (e.g., depth) of the timeslot memory buffer can be checked, as shown at block 612. All of the steps can be repeated as needed for ongoing cell processing. The cells can be, for example, the aforementioned ATM AAL0 and/or ATM AAL1 cells. As discussed above, the line side can be circuit-based. The timeslot memory buffer can be implemented, for example, in a high speed SRAM, on die. It should be very responsive to the line side, in the same manner that a cache memory for a modern CPU is very responsive to requests for instructions and/or data.

With continued reference to FIG. 6, and with reference also to the exemplary pseudo-code below, certain additional optional method steps will be described.

Pseudo-code for Fractional ATM Cell Method xfer=Number of octets/bytes of data to transfer from bulk Cell Buffer Memory to Timeslot Buffer Memory.

dc_index=Deconstruction index. This index points to the first un-used octet of the current ATM cell.

fill=Cell Fill level; the number of octets of payload in the ATM cell.

data=Transfer data read from the ATM cell payload.

data_size=Amount of valid data read from the ATM cell payload.

Code Begin

```
do forever{
    // Transfer an amount of data from the Cell Buffer memory to the
Timeslot Buffer memory
    if( (fill – dc_index) > xfer ) { // Transfer does not completely read all
remaining payload in the ATM Cell
        data = cell_buffer_memory[dc_index];
        data_size = xfer;
        dc_index = dc_index + xfer;
```

-continued

```
    }
    else { // Transfer all remaining payload in the ATM Cell
        data = cell_buffer_memory[dc_index];
        data_size = fill-dc_index;
        dc_index = 0;
        discard_atm_cell( ); // Discard the current ATM Cell and ready the
next ATM cell for processing
    }
    write_to_timeslot_buffer_memory(data, data_size);
// Write data into Timeslot Buffer Memory
    // Wait for the timeslot buffer memory to become empty, or near empty,
before reading more data
    // from the cell buffer memory.
    do {
        wait;
    } while(timeslot_buffer_memory != empty);
}
```

When causing the predetermined number of bytes N to be retrieved from the cell buffer bulk memory into the timeslot memory buffer, if the step of causing the retrieval will completely read all remaining portions of the payload in a given one of the cells, one can calculate an amount of valid data as being equal to the number of data bytes in the cell minus a deconstruction index, and then one can reset the deconstruction index to zero. If it is determined that the step of causing the retrieval will not completely read all remaining portions of the payload, an amount of valid data can be calculated as being equal to the predetermined number of bytes to be retrieved from the cell buffer bulk memory into the timeslot memory buffer, and the deconstruction index can be set to the previous value of the deconstruction index, plus the predetermined number of bytes to be retrieved from the cell buffer bulk memory into the timeslot memory buffer. Pertinent concepts regarding the deconstruction index are set forth in the pseudo-code above, and will also be discussed in greater detail with regard to FIGS. 7-11.

Figure 7:
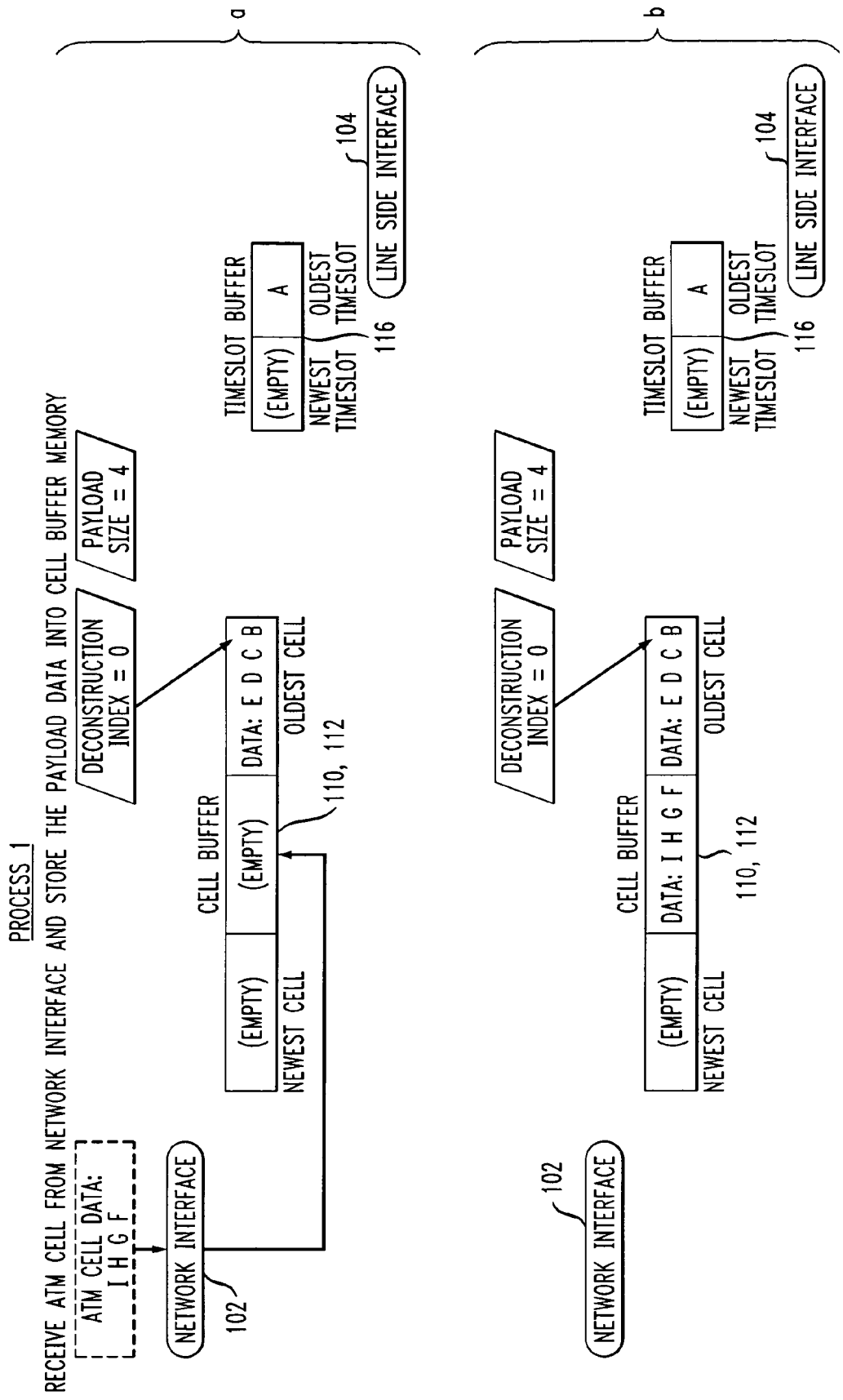
FIG. 7 depicts certain exemplary details of process 1 in FIG. 6.

Attention should now be given to FIG. 7, which depicts certain details of process one in FIG. 6. The depictions are made for an exemplary payload size of 4, for purposes of illustrative convenience, it being understood that the principles depicted can be adapted to any payload size. As shown at portion a, data IHGF is present in an ATM cell at network interface 102 and this data is about to be placed in cell buffer 110 and/or 112. The oldest cell in buffer 110, 112 includes data EDCB, and the deconstruction index is zero. The timeslot buffer 116 has data A in the oldest timeslot and the newest timeslot is empty. In portion b, the data IHGF has been read into the cell buffer 110, 112.

Figure 8:
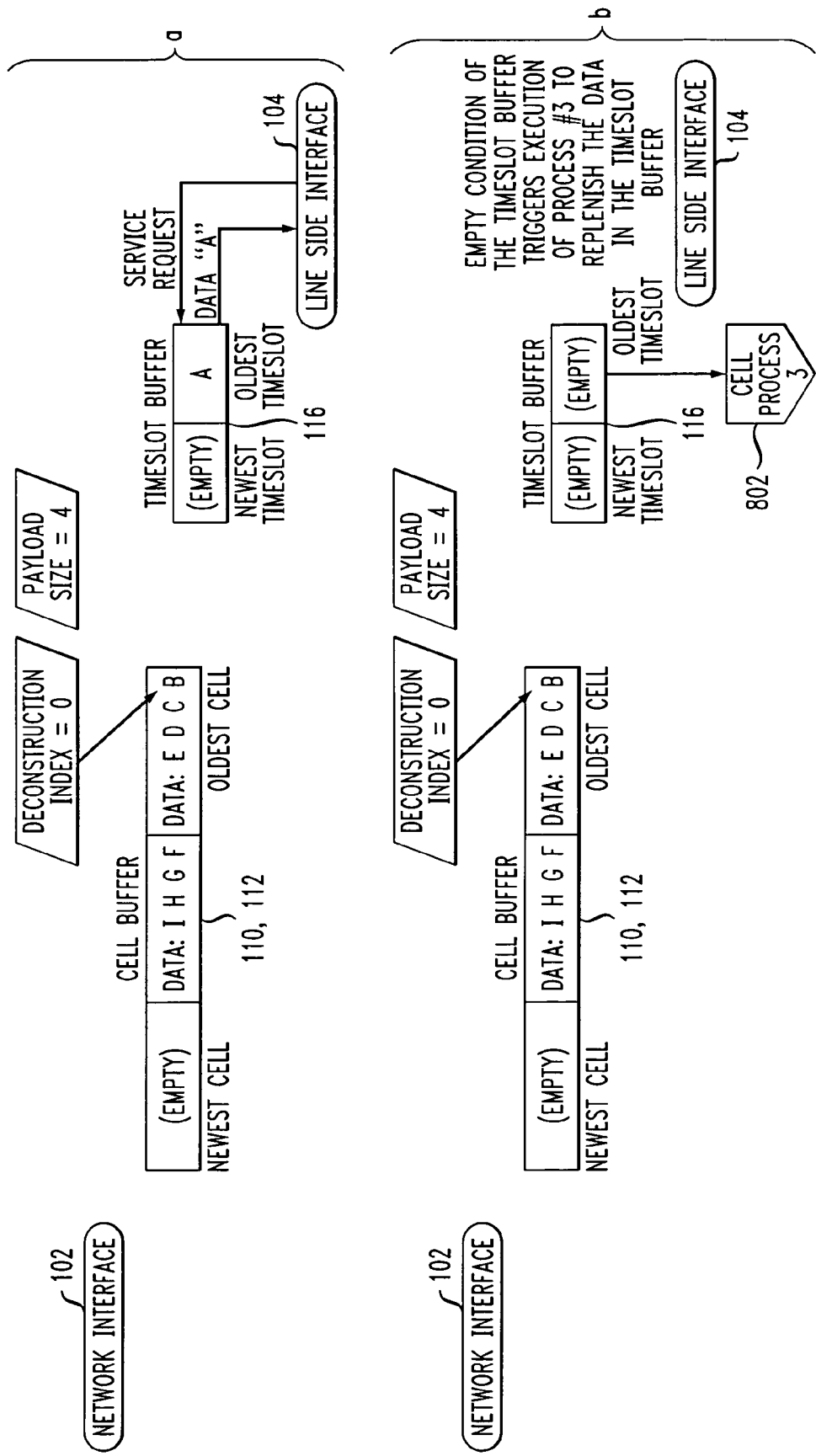
FIG. 8 depicts certain exemplary details of process 2 in FIG. 6.

In FIG. 8, portion a, a line side data request is received in the timeslot buffer control module from line side interface 104. In response, data A, the oldest timeslot in buffer 116, is provided to line side interface 104. In portion b, the timeslot buffer 116 is now empty, triggering execution of process number 3 to replenish the data in the timeslot buffer. The call to process 3 is indicated at block 802.

In FIG. 9, the call 802 from process 2 to process 3 is shown as a process 2 trigger. In portion a, responsive to this trigger, the 2 bytes of data CB are moved from the cell buffer 110, 112 to the timeslot buffer 116. The deconstruction index is incremented by two. Then, as shown at portion b, the timeslot buffer contains data CB, with data C being in the newest timeslot and data B being in the oldest timeslot. Deconstruction index 2 now points to data D in the oldest cell in cell buffer 110, 112.

Figure 10:
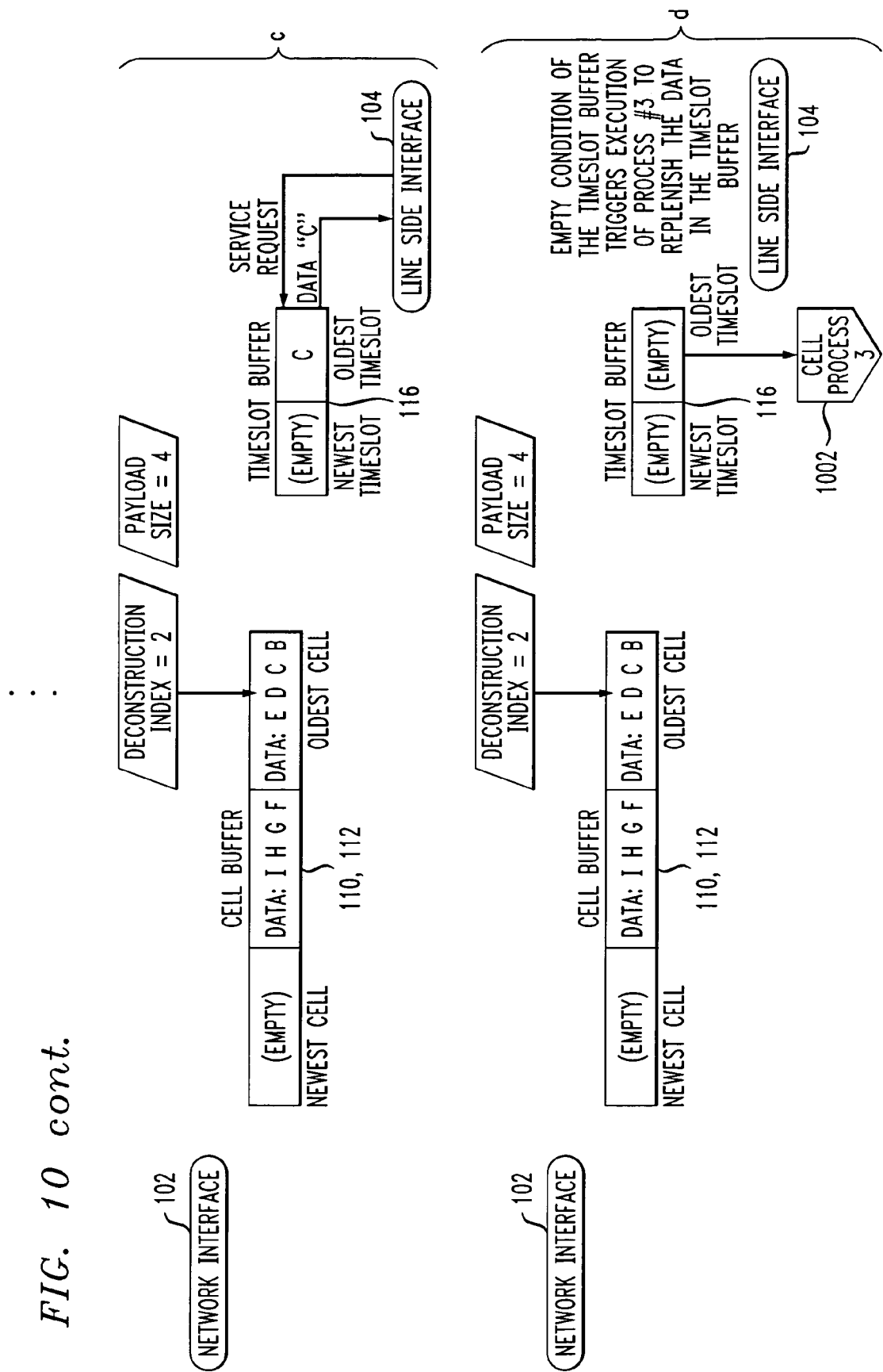
FIG. 10 depicts certain additional exemplary details of process 2 in FIG. 6.

Attention should now be given to FIG. 10. The line side requests for data are serviced by sending the B and C data from the timeslot buffer 116 to the line side interface 104. The sending of data B is depicted in portion a. As shown in portion b, this now leaves the timeslot buffer with data C in the oldest timeslot and the newest timeslot empty. As shown now in portion c, data C is also sent to the line side interface 104, and finally in portion d, the timeslot buffer is completely empty, data B and C both having been sent to the line side interface 104. The empty condition of buffer 116 triggers execution of process number 3 to replenish the data in the timeslot buffer 116. This is depicted at block 1002, showing the call to process 3.

Figure 11:
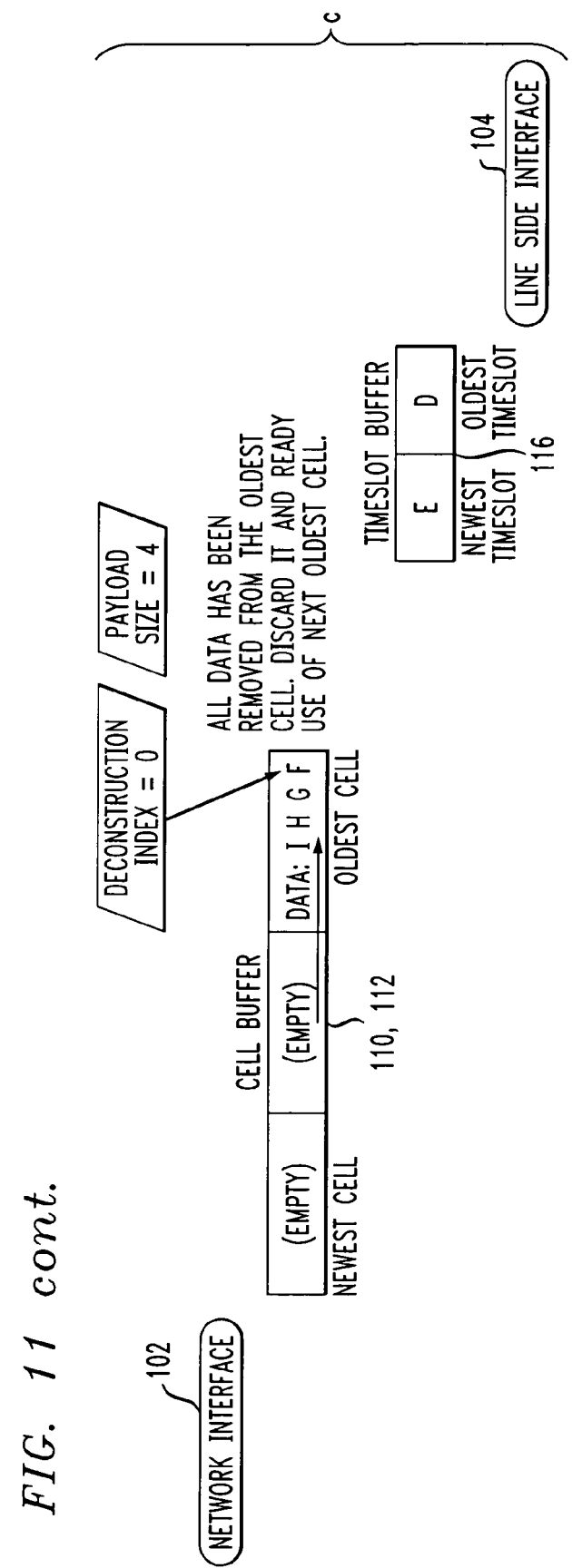
FIG. 11 depicts certain additional exemplary details of process 3 in FIG. 6.

In FIG. 11, the process 3 call 1002 is shown as a process 2 trigger. FIG. 11 shows the process 2 request being serviced by transferring a fraction of the payload in the cell buffer 110, 112 to the timeslot buffer 116. In portion a, the 2 bytes of data ED are moved to the timeslot buffer 116 and the deconstruction index is incremented by 2. Referring to portion b, timeslot buffer 116 now contains data ED in the newest and oldest timeslots respectively. The deconstruction index is now 4. Since this is greater than or equal to the payload size, all the data in the oldest cell has been used. The old cell is thus discarded and the next cell is ready for use. The deconstruction index is reset to 0. The resulting condition is shown in portion c. Timeslot buffer 116 contains data ED as at portion b. The old cell has been discarded and the cell containing data IHGF is now the oldest cell, with a deconstruction index of 0 pointing at data F.

At least a portion of the techniques of the present invention described herein may be implemented in an integrated circuit. In forming integrated circuits, a plurality of identical die is typically formed in a repeated pattern on a surface on a semiconductor wafer. Each die can include an entire circuit or elements as described herein, and can include other structures or circuits. The individual die are cut or diced from the wafer and then packaged as an integrated circuit. One skilled in the art will know how to dice wafers and package die to produce integrated circuits. Integrated circuits so manufactured are considered part of this invention. Further, from the descriptions of the circuits provided herein, the skilled artisan will be able to develop appropriate mask sets for fabricating integrated circuits according to one or more embodiments of the present invention.

Although illustrative embodiments of the present invention have been described herein, it is to be understood that the invention is not limited to those precise embodiments, and that various other changes and modifications may be made by one skilled in the art without departing from the scope of the invention as set forth in the appended claims.

I claim:

1. A method of processing cells in a communications system, comprising the steps of:

causing at least one of the cells, from a network side, to be stored into a cell buffer bulk memory, said cell having a payload comprising a plurality of data bytes;

responsive to detecting a predetermined fullness condition of a timeslot memory buffer, causing a predetermined number of said bytes to be retrieved from said cell buffer bulk memory into said timeslot memory buffer, said predetermined number of said bytes corresponding to a fraction of said payload of said cell;

responsive to a line-side data requirement, causing at least one of said predetermined number of bytes to be retrieved from said timeslot memory buffer to a line side; and repeating, as needed, said steps of causing said at least one cell to be stored into said cell buffer bulk memory, causing said predetermined number of said bytes to be retrieved from said cell buffer bulk memory into said timeslot memory buffer, and causing said at least one of said predetermined number of bytes to be retrieved from said timeslot memory buffer to said line side, for ongoing processing of said cells;

wherein:

said predetermined number of said bytes to be retrieved from said cell buffer bulk memory into said timeslot memory buffer is determined based on at least virtual channel characteristics; and said step of causing said predetermined number of said bytes to be retrieved from said cell buffer bulk memory into said timeslot memory buffer comprises the substeps of:

determining whether said step of causing said retrieval will completely read all remaining portions of said payload in a given one of the cells;

responsive to determining that said step of causing said retrieval will completely read all remaining portions of said payload, calculating an amount of valid data as equal to a number of data bytes in said cell less a deconstruction index, and resetting said deconstruction index to zero;

responsive to determining that said step of causing said retrieval will not completely read all remaining portions of said payload, calculating an amount of valid data as equal to said predetermined number of said bytes to be retrieved from said cell buffer bulk memory into said timeslot memory buffer, and setting a deconstruction index to a previous value of said deconstruction index plus said predetermined number of said bytes to be retrieved from said cell buffer bulk memory into said timeslot memory buffer.

2. The method of claim 1, wherein said timeslot memory buffer is formed as part of a communications integrated circuit and said cell buffer bulk memory is located off said communications integrated circuit.

3. The method of claim 1, wherein said timeslot memory buffer is formed as part of a communications integrated circuit and said cell buffer bulk memory is located on said communications integrated circuit.

4. The method of claim 1, wherein said step of causing said at least one cell from said network side to be stored in said cell buffer bulk memory is carried out for a plurality of cells from said network side, such that a plurality of said cells are stored in said cell buffer bulk memory.

5. The method of claim 1, wherein said predetermined fullness condition comprises a depth of said timeslot memory buffer, further comprising the additional step of causing said depth of said timeslot memory buffer to be checked.

6. The method of claim 1, wherein the cells are at least one of asynchronous transfer mode (ATM) adaptation layer zero (AAL0) cells and asynchronous transfer mode (ATM) adaptation layer one (AAL1) cells.

7. The method of claim 1, wherein said line side is circuit-based.

8. The method of claim 1, wherein said cell buffer bulk memory comprises a double data-rate synchronous dynamic random access memory (DDR-SDRAM) and said timeslot memory buffer comprises a high speed static random access memory (SRAM).

9. The method of claim 1, wherein said predetermined number of said bytes to be retrieved from said cell buffer bulk memory into said timeslot memory buffer is further determined based on at least one of memory width, memory latency, memory speed, processor speed, and processor latency.

10. A circuit for processing cells in a communications system, between a network side and a line side, said circuit interfacing with a cell buffer bulk memory, said circuit comprising:

a cell processing module;

a cell buffer bulk memory interface coupled to said cell processing module;

a timeslot processing module coupled to said cell processing module; and a timeslot memory buffer coupled to said timeslot processing module; wherein:

said cell processing module is configured to:

cause at least one of the cells, from the network side, to be stored into the cell buffer bulk memory, said cell having a payload with a plurality of data bytes;

cause a predetermined number of said bytes to be retrieved from the cell buffer bulk memory into said timeslot memory buffer, responsive to a predetermined fullness condition of said timeslot memory buffer, said predetermined number of said bytes corresponding to a fraction of said payload of said cell;

said timeslot processing module is configured to cause at least one of said predetermined number of bytes to be retrieved from said timeslot memory buffer to said line side, responsive to a line-side data requirement;

said cell processing module and said timeslot processing module are further configured to repeat, as needed, said causing of said at least one cell to be stored into the cell buffer bulk memory, said causing of said predetermined number of said bytes to be retrieved from the cell buffer bulk memory into said timeslot memory buffer, and said causing of said at least one of said predetermined number of bytes to be retrieved from said timeslot memory buffer to said line side, for ongoing processing of said cells;

said predetermined number of said bytes to be retrieved from the cell buffer bulk memory into said timeslot memory buffer is determined based on at least virtual channel characteristics; and said cell processing module causes said predetermined number of said bytes to be retrieved from the cell buffer bulk memory into said timeslot memory buffer by:

determining whether said causing of said retrieval will completely read all remaining portions of said payload in a given one of the cells;

responsive to determining that said causing of said retrieval will completely read all remaining portions of said payload, calculating an amount of valid data as equal to a number of data bytes in said cell less a deconstruction index, and resetting said deconstruction index to zero;

responsive to determining that said causing of said retrieval will not completely read all remaining portions of said payload, calculating an amount of valid data as equal to said predetermined number of said bytes to be retrieved from the cell buffer bulk memory into said timeslot memory buffer, and setting a deconstruction index to a previous value of said deconstruction index plus said predetermined number of said bytes to be retrieved from the cell buffer bulk memory into said timeslot memory buffer.

11. The circuit of claim 10, wherein said circuit is formed as an integrated circuit.

12. The circuit of claim 11, further comprising the cell buffer bulk memory, said cell buffer bulk memory being formed on said integrated circuit and being coupled to said cell buffer bulk memory interface, wherein said cell buffer bulk memory interface comprises conductive paths formed on said integrated circuit.

13. The circuit of claim 11, wherein said cell buffer bulk memory interface comprises a connector configured for off-die interconnection to an external cell buffer bulk memory not forming a part of said integrated circuit.

14. The circuit of claim 13, further comprising an on-die cell buffer bulk memory formed as part of said integrated circuit and coupled to said cell processing module, said cell processing module being configured for selective communication with said on-die cell buffer bulk memory and the external cell buffer bulk memory not forming a part of said integrated circuit.

15. The circuit of claim 10, wherein said cell processing module is further configured to cause a plurality of cells from the network side to be stored in the cell buffer bulk memory.

16. The circuit of claim 10, wherein said predetermined fullness condition comprises a depth of said timeslot memory buffer, and wherein said timeslot processing module is configured to cause said depth of said timeslot memory buffer to be checked.

17. A mask set for forming an integrated circuit for processing cells in a communications system, between a network side and a line side, said circuit interfacing with a cell buffer bulk memory, said mask set comprising a plurality of masks capable of being used to form:
   a cell processing module;
   a cell buffer bulk memory interface coupled to said cell processing module;
   a timeslot processing module coupled to said cell processing module; and
   a timeslot memory buffer coupled to said timeslot processing module; wherein:
   said cell processing module is configured to:
      cause at least one of the cells, from the network side, to be stored into the cell buffer bulk memory, said cell having a payload with a plurality of data bytes;
      cause a predetermined number of said bytes to be retrieved from the cell buffer bulk memory into said timeslot memory buffer, responsive to a predetermined fullness condition of said timeslot memory buffer, said predetermined number of said bytes corresponding to a fraction of said payload of said cell;
   said timeslot processing module is configured to cause at least one of said predetermined number of bytes to be retrieved from said timeslot memory buffer to said line side, responsive to a line-side data requirement;
   said cell processing module and said timeslot processing module are further configured to repeat, as needed, said causing of said at least one cell to be stored into the cell buffer bulk memory, said causing of said predetermined number of said bytes to be retrieved from the cell buffer bulk memory into said timeslot memory buffer, and said causing of said at least one of said predetermined number of bytes to be retrieved from said timeslot memory buffer to said line side, for ongoing processing of said cells;
   said predetermined number of said bytes to be retrieved from the cell buffer bulk memory into said timeslot memory buffer is determined based on at least virtual channel characteristics; and
   said cell processing module causes said predetermined number of said bytes to be retrieved from the cell buffer bulk memory into said timeslot memory buffer by:
      determining whether said causing of said retrieval will completely read all remaining portions of said payload in a given one of the cells;
      responsive to determining that said causing of said retrieval will completely read all remaining portions of said payload, calculating an amount of valid data as equal to a number of data bytes in said cell less a deconstruction index, and resetting said deconstruction index to zero;
      responsive to determining that said causing of said retrieval will not completely read all remaining portions of said payload, calculating an amount of valid data as equal to said predetermined number of said bytes to be retrieved from the cell buffer bulk memory into said timeslot memory buffer, and setting a deconstruction index to a previous value of said deconstruction index plus said predetermined number of said bytes to be retrieved from the cell buffer bulk memory into said timeslot memory buffer.

* * * * *